United States Patent
Boe et al.

(10) Patent No.: US 11,353,429 B2
(45) Date of Patent: Jun. 7, 2022

(54) SYSTEM AND METHOD FOR DETECTING THE PRESENCE OF BUBBLES IN AQUEOUS SOLUTIONS

(71) Applicant: Wema System AS, Blomsterdalen (NO)

(72) Inventors: Hakon Boe, Blomsterdalen (NO); Bjornar Berge Lie, Blomerstdalen (NO)

(73) Assignee: TE CONNECTIVITY NORGE AS, Blomsterdalen (NO)

( * ) Notice: Subject to any disclaimer, the term of this patent is extended or adjusted under 35 U.S.C. 154(b) by 0 days.

(21) Appl. No.: 16/745,496

(22) Filed: Jan. 17, 2020

(65) Prior Publication Data
US 2020/0232948 A1 Jul. 23, 2020

(30) Foreign Application Priority Data

Jan. 18, 2019 (EP) .................................... 19152657

(51) Int. Cl.
*G01N 29/036* (2006.01)
*G01N 29/46* (2006.01)
*B60K 13/04* (2006.01)

(52) U.S. Cl.
CPC ........... *G01N 29/036* (2013.01); *G01N 29/46* (2013.01); *B60K 13/04* (2013.01); *G01N 2291/02433* (2013.01); *G01N 2291/101* (2013.01)

(58) Field of Classification Search
CPC .... G01N 29/036; G01N 29/46; G01N 29/032; G01N 29/348; G01N 29/024; G01N 29/4409; G01N 29/02; G01N 2291/02433; G01N 2291/101; G01N 2291/011; G01N 2291/015; G01N 2291/045; G01N 2291/048; G01N 2291/102
USPC ........................... 73/64.53, 620, 629, 861.25
See application file for complete search history.

(56) References Cited

U.S. PATENT DOCUMENTS

| | | | | |
|---|---|---|---|---|
| 4,689,986 | A * | 9/1987 | Carson | A61B 8/481 600/438 |
| 2004/0060356 | A1* | 4/2004 | Scott | G01N 29/11 73/599 |
| 2015/0059442 | A1* | 3/2015 | Liljenberg | G01N 29/46 73/24.01 |
| 2016/0238429 | A1* | 8/2016 | Stangl | F01N 3/2896 |
| 2020/0209031 | A1* | 7/2020 | Dabak | G01F 15/024 |

* cited by examiner

*Primary Examiner* — Tarun Sinha

(57) ABSTRACT

A system for detecting the presence of bubbles in a solution includes an ultrasonic receiver, receiving a pair of signals having different frequencies after passage through the solution, and a computing unit. The computing unit computes a signal value for each of the signals, the signal value representing a defined signal property, compares the signal values for the signals with each other and/or each with a predefined reference value, and computes a deviation of the signal values from each other and/or between the signal values and the predefined reference value. The computing unit generates a bubble confirmation signal that confirms the presence of bubbles in the solution if the deviation is greater than a predefined threshold value.

18 Claims, 1 Drawing Sheet

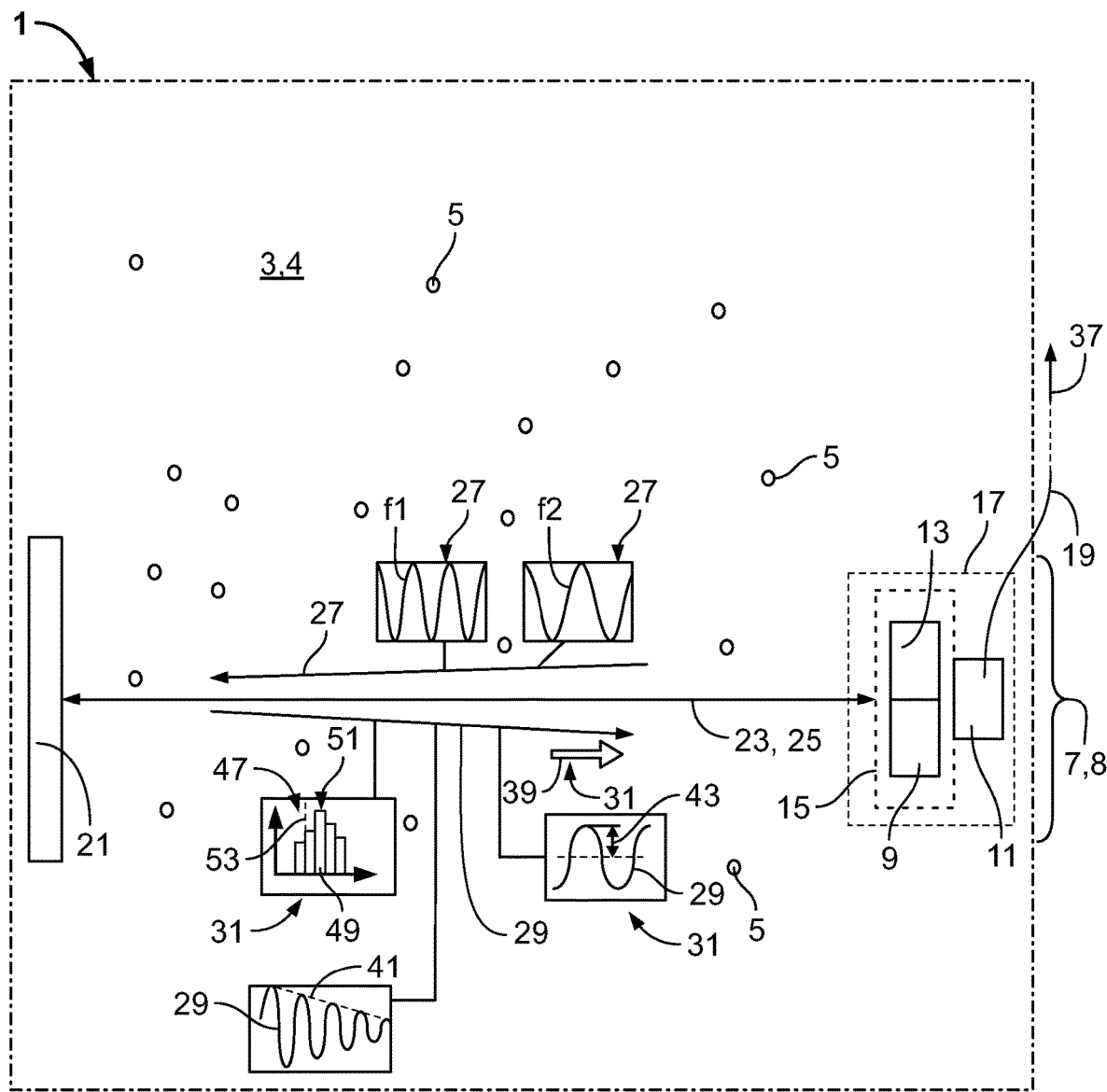

SYSTEM AND METHOD FOR DETECTING THE PRESENCE OF BUBBLES IN AQUEOUS SOLUTIONS

CROSS-REFERENCE TO RELATED APPLICATION

This application claims the benefit of the filing date under 35 U.S.C. § 119(a)-(d) of European Patent Application No. 19152657, filed on Jan. 18, 2019.

FIELD OF THE INVENTION

The present invention relates to a system for detecting the presence of bubbles and, more particularly, to a system for detecting the presence of microbubbles in an aqueous solution.

BACKGROUND

The presence of bubbles in an aqueous solution may have negative effects in certain cases, in particular for the accuracy of measurements in the solution. For example, the properties of diesel exhaust fluid (DEF) often need to be monitored in order to ensure the solution's functionality for cleaning diesel exhaust fumes. Thereby, at least one sensor may be placed inside a volume containing the solution. Commonly, a speed of sound measurement is used for detecting the type and/or quality of the solution in the volume. However, urea solution tends to produce bubbles under vibrations and a measurement of the speed of sound may not be accurate when bubbles are in the solution.

SUMMARY

A system for detecting the presence of bubbles in a solution includes an ultrasonic receiver, receiving a pair of signals having different frequencies after passage through the solution, and a computing unit. The computing unit computes a signal value for each of the signals, the signal value representing a defined signal property, compares the signal values for the signals with each other and/or each with a predefined reference value, and computes a deviation of the signal values from each other and/or between the signal values and the predefined reference value. The computing unit generates a bubble confirmation signal that confirms the presence of bubbles in the solution if the deviation is greater than a predefined threshold value.

BRIEF DESCRIPTION OF THE DRAWINGS

The invention will now be described by way of example with reference to the accompanying FIGURE, of which:

FIG. 1 is a schematic diagram of a system according to an embodiment.

DETAILED DESCRIPTION OF THE EMBODIMENT(S)

Exemplary embodiments of the present invention will be described hereinafter in detail with reference to the attached drawings, wherein like reference numerals refer to like elements. The present invention may, however, be embodied in many different forms and should not be construed as being limited to the embodiments set forth herein. Rather, these embodiments are provided so that the present disclosure will convey the concept of the invention to those skilled in the art. The various features shown in the embodiments may be used independently of one another in specific applications.

In the embodiment shown in FIG. 1, a volume 1, which may be a tank, in particular a tank for diesel exhaust fluid, is at least partially filled with an aqueous solution 3. The solution 3, in an embodiment, is a urea solution 4, such as for cleaning diesel exhaust fumes. In the solution 3, bubbles 5 may be present. The bubbles 5 usually contain air, solution 3 in the gas phase, or a combination of both.

In order to detect the presence of bubbles 5 in the solution 3, in particular microbubbles 5, a system 7 is provided in the volume 1, as shown in FIG. 1. The term "microbubbles" refers to bubbles 5 that are of sizes below the millimeter range.

The system 7, as shown in FIG. 1, comprises an ultrasonic receiver 9 and a computing unit 11. In an embodiment, the system 7 has an ultrasonic transmitter 13. In the shown embodiment, the receiver 9 and the transmitter 13 are combined in an ultrasonic transducer 15.

At least the receiver 9 and the computing unit 11 are arranged in or mounted on a common housing 17, as shown in the embodiment of FIG. 1. The system 7 is part of a urea sensor system 8 for measuring the quality and/or type of a urea solution 4 in the volume 1. The parts of the system 7, in particular the receiver 9, the transmitter 13, and the computing unit 11 may be the same for both systems 7 and 8. The method according to the invention may be performed on a urea sensor system 8 or a urea quality measurement may be performed on a system 7 according to the invention.

The computing unit 11 may comprise a computer, a microcontroller, a field-programmable gate array (FPGA) or other suitable devices for calculating the desired values. In an embodiment, the computing unit 11 is also adapted to control the receiver 9 and/or the transmitter 13. The computing unit 11 is connected via at least one data line 19 to an entity outside the volume 1. The entity may be a display, a computer or any other suitable device for receiving data from the computing unit 11. The data line 19 may be wired or wireless.

The system 7 is described with respect to a transducer 15 in the following. However, as described above, the system 7 may instead comprise a separated receiver 9 and a separated transmitter 13 or only a receiver 9. In the latter case, a transmitter may be present in the volume 1, wherein the transmitter is not part of the system 7.

As shown in FIG. 1, the system 7 comprises a reflector 21 for reflecting ultrasonic signals. The reflector 21 is arranged opposite to and spaced apart from the transducer 15 at a distance 23. Between the transducer 15 and the reflector 21, solution 3 may be present when the volume 1 is filled with the solution 3. The reflector 21 increases a path length 25 which, in the present embodiment, is given by two times the distance 23. In another embodiment, the reflector 21 can be omitted and a receiver 9 and transmitter 13 may be arranged spaced apart from each other in the volume 1, a distance between the receiver 9 and the transmitter 13 defining the path length 25 in the solution 3. An increased path length 25 between the receiver 9 and the transmitter 13 increases the accuracy of the speed of sound measurement.

For detecting bubbles 5 in the solution 3, the transducer 15 may generate and emit signals 27 into the solution 3 towards the reflector 21, as shown in FIG. 1. These transmitted signals 27 have different frequencies f. In an embodiment, at least two signals 27 having different frequencies f from a set of frequencies [f1, f2, . . . , fn] are emitted by the transducer 15. Two different signals 27 are exemplarily shown in FIG. 1. Each signal 27 has a fixed frequency f.

During the passage through the solution 3, the signals 27 can be altered due to the properties of the solution 3, in particular when bubbles 5 are present in the solution 3. These altered signals 27 may be received as received signals 29 by the transducer 13, shown in FIG. 1. These received ultrasonic signals 29 are then converted into electronic signals and further processed by the computing unit 11.

In an embodiment, the computing unit 11 computes at least one signal value 31 shown in FIG. 1 for each received signal 29, wherein the signal value 31 represents a defined signal property. In various embodiments, the signal value 31 is at least one of the following: the signal amplitude, the time of flight, and the frequency at which a frequency spectrum has its maximum.

The computed signal values 31 are compared for different signals 27, 29. In an embodiment, the different signals 27, 29 may be signals which are separated in time and which have a time gap between them. In another embodiment, the different signals 27, 29 may also be components of a larger continuous signal with varying frequency. In the latter case, the term "signal" as used herein refers to sections of the larger continuous signal in which the frequency is stable. The signal values 31 are compared for different frequencies f. Thereby, the frequency dependency of the signals 27, 29 can be analyzed. Additionally or alternatively, the signal values 31 may also be compared to predefined reference values for the detection of bubbles 5.

In order to decide if bubbles 5 are present in the solution 3, a deviation between two signal values 31 for different frequencies f may be compared to a predefined threshold value. If the deviation exceeds the threshold value, then the presence of bubbles 5 in the solution 3 may be concluded. The computing unit 11 may then generate at least one bubble confirmation signal 37, shown in FIG. 1, that can be transmitted via the data line 19.

The frequency dependency of certain properties of the received signals 29 is higher when bubbles 5 are present in the solution 3. Therefore, the system 7, 8 may be calibrated by measuring the frequency dependency of certain properties of the received signals 29 in a state when it is known that no bubbles 5 are present in the solution 3. Such a state without bubbles 5 may, for example, be achieved when the solution 3 is at rest for a certain time.

In order to quickly detect bubbles 5 in the solution 3, a time of flight 39 for each signal 27, 29 may be computed. The time of flight 39 is indicated by an arrow in FIG. 1. The time of flight 39 is defined as the time that it takes for a signal 27, 29 to travel along the path length 25 through the solution 3. The times of flight 39 for signals 27, 29 having different frequencies f can be compared by the computing unit 11. If the times of flight 39 differ from each other by a deviation that exceeds a predefined threshold value, then the presence of bubbles 5 in the solution 3 may be confirmed.

Additionally, or in the alternative, for each signal 27, 29, an envelope 41 may be calculated by the computing unit 11, as shown in FIG. 1. The time of flight 39 may then be calculated for each envelope 41 by the computing unit 11. These times of flight 39 for different envelopes 41 may then be compared as described above.

In another embodiment of detecting bubbles 5, the amplitude 43 of each received signal 29 shown in FIG. 1 can be used as signal value 31. The amplitudes 43 for signals 27, 29 having different frequencies f can be compared with each other. If the deviation between the amplitudes 43 is larger than a predefined threshold value, the presence of bubbles can be concluded. In an additional method step, the amplitudes 43 may be referenced using a predefined reference value for each amplitude 43 before the amplitudes 43 of different signals 29 are compared with each other. For example, the amplitudes 43 may be referenced by dividing each amplitude 43 by a predefined reference value.

For each received signal 27, 29, a frequency spectrum 47 shown in FIG. 1 may be computed by the computing unit 11. In particular, the frequency spectrum 47 may be computed using a fast Fourier transformation (FFT). Using this frequency spectrum 47, a frequency 49 at which the frequency spectrum 47 has a maximum 51 can be calculated. This frequency 49 can be compared to a predefined reference value 53. The reference value 53 may, in this case, be the starting frequency f of the transmitted signal 27. If the deviation between the frequency 49 and the reference value 53 exceeds a predefined threshold value, the presence of bubbles 5 can be concluded.

The embodiments described above may easily be combined. In an embodiment, first the time of flight 39 is computed and then afterwards the amplitude 43 or the maximum 51 of the frequency spectrum 47. These embodiments may be combined with each other independently. The aforementioned method may, in particular, be performed by a system that is also capable of performing a speed of sound measurement for analyzing the quality of urea solution 3.

What is claimed is:

1. A system for detecting the presence of bubbles in a solution, comprising:
    an ultrasonic receiver receiving a pair of signals having different frequencies after passage through the solution; and
    a computing unit computing a signal value for each of the signals, the signal value representing a defined signal property, comparing the signal values for the signals with each other and/or each with a predefined reference value, computing a deviation of the signal values from each other and/or between the signal values and the predefined reference value, and generating a bubble confirmation signal that confirms the presence of bubbles in the solution if the deviation is greater than a predefined threshold value.

2. The system of claim 1, wherein the solution is an aqueous solution.

3. The system of claim 2, wherein the aqueous solution is a urea solution.

4. The system of claim 1, further comprising an ultrasonic transmitter generating the pair of signals.

5. The system of claim 4, further comprising an ultrasonic transducer in which the ultrasonic transmitter and the ultrasonic receiver are combined.

6. The system of claim 1, further comprising a reflector spaced apart from and arranged opposite to the ultrasonic receiver, the reflector reflecting the pair of signals to the ultrasonic receiver.

7. The system of claim 1, wherein the signal value is at least one of a signal amplitude, a time of flight, and a frequency at which a frequency spectrum has a maximum.

8. A method for detecting the presence of bubbles in a solution, comprising:
    receiving a pair of ultrasonic signals having different frequencies after passage through the solution;
    computing a signal value for each of the ultrasonic signals, the signal value representing a defined signal property;
    comparing the signal values for the ultrasonic signals with each other and/or each with a predefined reference value;

computing a deviation of the signal values from each other and/or between the signal values and the predefined reference value; and generating a bubble confirmation signal that confirms the presence of bubbles in the solution if the deviation is greater than a predefined threshold value.

9. The method of claim 8, wherein the ultrasonic signals having different frequencies are emitted into the solution prior to receiving the ultrasonic signals.

10. The method of claim 8, wherein a time of flight for each of the ultrasonic signals is computed and used as the signal value.

11. The method of claim 10, wherein an envelope is calculated for each of the ultrasonic signals and used for computing the time of flight.

12. The method of claim 8, wherein an amplitude of each of the ultrasonic signals is computed and used as the signal value.

13. The method of claim 12, wherein the amplitude of each of the ultrasonic signals is referenced using a predefined reference value for each of the ultrasonic signals before the comparing step.

14. The method of claim 8, wherein a frequency spectrum is computed for each of the ultrasonic signals.

15. The method of claim 14, wherein a frequency at which the frequency spectrum has a maximum is used as the signal value.

16. The method of claim 15, wherein a fast Fourier transformation is used for computing the frequency spectrum.

17. A urea sensor system for measuring a property of a urea solution in a volume, comprising:

a system including an ultrasonic receiver receiving a pair of signals having different frequencies after passage through the urea solution and a computing unit computing a signal value for each of the signals, the signal value representing a defined signal property, comparing the signal values for the signals with each other and/or each with a predefined reference value, computing a deviation of the signal values from each other and/or between the signal values and the predefined reference value, and generating a bubble confirmation signal that confirms the presence of bubbles in the urea solution if the deviation is greater than a predefined threshold value.

18. The urea sensor system of claim 17, wherein the urea sensor system is used to measure a speed of sound in the urea solution.

* * * * *